United States Patent
Wei et al.

(10) Patent No.: US 10,602,475 B2
(45) Date of Patent: Mar. 24, 2020

(54) METHOD AND SYSTEM FOR DEVICE LOCATION MANAGEMENT

(71) Applicant: Huawei Technologies Co., Ltd., Shenzhen, Guangdong (CN)

(72) Inventors: Qing Wei, Munich (DE); David Perez Caparros, Munich (DE); Xueli An, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/291,619

(22) Filed: Mar. 4, 2019

(65) Prior Publication Data
US 2019/0200316 A1 Jun. 27, 2019

Related U.S. Application Data (63) Continuation of application No. PCT/EP2016/070889, filed on Sep. 5, 2016.

(51) Int. Cl.
*H04W 64/00* (2009.01)
*H04W 4/029* (2018.01)

(52) U.S. Cl.
CPC ........... *H04W 64/00* (2013.01); *H04W 4/029* (2018.02)

(58) Field of Classification Search
CPC ......... H04W 4/02; H04W 64/00; H04W 4/04; H04L 41/0618; G06F 9/5077
See application file for complete search history.

(56) References Cited

U.S. PATENT DOCUMENTS

| | | | | |
|---|---|---|---|---|
| 2001/0018349 A1* | 8/2001 | Kinnunen | ............... | H04W 4/02 455/456.3 |
| 2008/0244579 A1* | 10/2008 | Muller | .................. | G06F 9/5027 718/100 |
| 2010/0075697 A1* | 3/2010 | Gupta | ..................... | H04W 4/02 455/456.3 |
| 2014/0330921 A1 | 11/2014 | Storm et al. | | |
| 2014/0351409 A1* | 11/2014 | Basoglu | .............. | H04L 41/0869 709/224 |
| 2015/0072705 A1 | 3/2015 | Zhang | | |
| 2017/0078153 A1* | 3/2017 | Zhang | ..................... | H04L 41/12 |

FOREIGN PATENT DOCUMENTS

WO 2016086214 A1 6/2016

OTHER PUBLICATIONS

Huawei, "RAN Support for Core Network Slicing," RAN WG3 Meeting #93, R3-161759, Gothenburg, Sweden, Aug. 22-26, 2016, 14 pages.

(Continued)

*Primary Examiner* — Nizar N Sivji
(74) *Attorney, Agent, or Firm* — Slater Matsil, LLP (57) ABSTRACT

The embodiments of the disclosure relates to a device location manager for a communication system, the device location manager comprising: a southbound interface configured to receive a physical location information of a mobile device from an infrastructure manager of the communication system, a location processor configured to map between the physical location information and a logical location information, and a northbound interface configured to send and/or receive the logical location information to and/or from at least two network slices of the communication system.

12 Claims, 8 Drawing Sheets

(56) References Cited

OTHER PUBLICATIONS

Nokia et al., "Update to the interaction between MM and SM," SA WG2 Meeting #116bis, S2-165115 was/merge S2-164397 + S2-164444+ S2-164600, Sanya, China, Aug. 29-Sep. 2, 2016, 10 pages.
"ETSI GS NFV-INF 001 V1.1.1 Network Functions Virtualisation (NFV);Infrastructure Overview", ETSI, Jan. 2015, 59 pages.
NGMN Alliance "NGMN 5G White Paper," Version 1.0, Feb. 17, 2015, 125 pages.
Sherwood, R. et al., "FlowVisor: A Network Virtualization Layer," OPENFLOW-TR-2009-1, Oct. 14, 2009, 15 pages.
3rd Generation Partnership Project; Technical Specification Group Services and System Aspects; Feasibility Study on New Services and Markets Technology Enablers; Stage 1 (Release 14), 3GPP TR 22.891 V14.1.0 (Jun. 2016), 95 pages.
3rd Generation Partnership Project; Technical Specification Group Services and System Aspects; Study on Architecture for Next Generation System (Release 14), 3GPP TR 23.799 V0.7.0 (Aug. 2016), 322 pages.

\* cited by examiner

METHOD AND SYSTEM FOR DEVICE LOCATION MANAGEMENT

CROSS-REFERENCE TO RELATED APPLICATIONS

This application is a continuation of International Application No. PCT/EP2016/070889, filed on Sep. 5, 2016, the disclosure of which is hereby incorporated by reference in its entirety.

TECHNICAL FIELD

The present embodiments of the application relates to a device location manager, a communication system and a method for managing device location information. The present embodiments of the application also relates to a computer-readable storage medium storing program code, the program code comprising instructions for carrying out a method for managing device location information.

BACKGROUND

Services are becoming more diverse in the 5G era. A single network architecture is not able to efficiently satisfy the diversion requirements for different use cases. The concept of network slices would facilitate the provision of certain type of network services to a certain group of uses cases sharing similar service requirements. New network slice can be provided on the fly without impacting the operation of the existing network slices. However, while the isolation nature of network slicing hinders the function sharing and information exchange between network slices.

A network slice, e.g., a "5G slice" may support the communication service of a particular connection type with a specific way of handling the Control-plane (C-plane) and User-plane (U-plane) for this service.

Each network slice can contain a set of C-plane functions (e.g., mobility management, session management, etc.) which are adapted to its specific service requirements (e.g., delay critical MTC, massive MTC, MBB . . . ). However, a complete, monolithic C-plane solution per slice is not efficient.

SUMMARY

One objective of the present embodiments of the disclosure is to provide a device location manager, a communication system and a method for managing device location information, wherein the device location manager, the communication system and the method overcome one or more of the above-mentioned problems of the prior art.

A first aspect of the embodiments of the disclosure provides a device location manager for a communication system, the device location manager comprising:
a southbound interface configured to receive a physical location information of a mobile device from an infrastructure manager of the communication system,
a location processor configured to map between the physical location information and a logical location information, and
a northbound interface configured to send and/or receive the logical location information to and/or from at least two network slices of the communication system.

Network slice refers to a logical network architecture which preferably comprises logical user devices, logical network nodes, and the logical links to interconnect them. Typically, one network slice is mapped to one control plane architecture.

Physical location refers to the location of a physical device in a physical infrastructure, e.g., a physical attachment point of a device.

Logical location refers to the location of a logical device in a network slice, e.g., an attached serving base station of a logical device and/or a tracking area where the logical device can be reached by the network.

The device location manager of the first aspect can be applied, e.g., in a 5G network system with multiple network slices. It can be used to enable a system which provides common location information and related functions that can be shared by multiple network slices. Furthermore, it can act as the interfaces to bridge the network slices to the infrastructure (e.g., infrastructure as a service). The device location manager of the first aspect can be seen as one type of shared network functions.

The terms "northbound" and "southbound" are not meant to be limiting.

The device location manager of the first aspect can provide a system for location related common information/function sharing between multiple network slices. It can be provided as a device location management module in the slice shared layer (for all the common functions of different slices) to gather the device location related information from different network slices, from physical/virtualised infrastructure, process them and share them to control plane functions in different network slices.

In a first implementation of the device location manager according to the first aspect,
the logical location information comprises an identifier of a logical user equipment, a logical access node and/or a tracking area, and/or
the physical location information comprises an identifier of a physical access node.

The physical location information can also comprise an identifier of a physical device. The physical access node can be e.g. a base station and/or an access point.

The device location manager of the first implementation has the advantage that the location information can be efficiently determined.

In a second implementation of the device location manager according to the first aspect as such or according to the first implementation of the first aspect, the device location manager further comprises a location collector configured to obtain a physical-logical mapping from the at least two network slices and/or the infrastructure manager and to obtain a mapped location information based on the physical-logical mapping.

The location collector can be configured to forward the physical-logical mapping and/or the mapped location information to the location processor. The physical-logical mapping can be any kind of mapping that allows the device location manager to obtain physical location information based on a logical location information and/or to obtain a logical location information based on a physical location information.

In a third implementation of the device location manager according to the first aspect as such or according to any of the preceding implementations of the first aspect, the device further comprises one or more location data stores configured to store logical and/or physical location information of mobile devices.

The location data store can be for example a database at the device location manager. The database can be configured to store location information corresponding to users of the communication system.

In a fourth implementation of the device location manager according to the first aspect as such or according to any of the preceding implementations of the first aspect, the one or more location data stores comprise a at least two slice-specific location data stores.

A slice-specific location data store can be configured to be accessible only through a protected interface, e.g. accessible only by one network operator. For example, each of the slice-specific location data stores can be protected through separate access information combination of user-name and password).

In a fifth implementation of the device location manager according to the first aspect as such or according to any of the preceding implementations of the first aspect, the device further comprises a location miner configured to determine a device location in a network slice.

In a sixth implementation of the device location manager according to the first aspect as such or according to any of the preceding implementations of the first aspect, the northbound interface is configured to:
 receive a location request from a slice specific function,
 receive a location information from a slice specific function, and/or
 send a location report to a slice specific function.

This has the advantage that the device location manager can efficiently exchange information with slice-specific functions.

In a seventh implementation of the device location manager according to the first aspect as such or according to any of the preceding implementations of the first aspect, the southbound interface is configured to send a monitoring request to the infrastructure manager. Preferably, the monitoring request comprises one or more of the following:
 an information about a physical interface,
 an information about a device to track,
 a location accuracy,
 a response time of the request, and
 duration of tracking.

This has the advantage that the device location manager can efficiently provide monitoring instructions to infrastructure components.

In an eighth implementation of the device location manager according to the first aspect as such or according to any of the preceding implementations of the first aspect, the southbound interface uses a poll model and/or the northbound interface uses a publish-subscribe model.

In publish-subscribe model, the information source (publisher) does not program the message to be sent directly to specific information consumer (subscriber), and has no knowledge of which subscriber. In the poll model, the information consumer actively requests the information from the information source.

Experiments have shown the combination of polling and publish-subscribe model of the eighth implementation to be particularly efficient in many cases. The actual model to be used can depend on the scenario (e.g., number of information source/consumer, query/information update frequency).

A second aspect of the embodiments of the disclosure refers to a communication system, comprising at least two network slices operating on a common infrastructure, and a device location manager according to the first aspect as such or according to any of the preceding implementations of the first aspect.

In a first implementation of the communication system of the second aspect, the system further comprises a mobile device that is connected to multiple network slices via a common physical interface.

In a second implementation of the communication system of the second aspect as such or according to the first implementation of the second aspect, the system further comprises a mobile device that is connected to multiple network slices via two or more physical interfaces.

A third aspect of the embodiments of the disclosure refers to a method for managing device location information in a communication system, the method comprises:
 receiving a physical location information of a mobile device from an infrastructure manager of the communication system,
 mapping between the physical location information and a logical location information, and
 sending and/or receiving the logical location information to and/or from at least two network slices of the communication system.

The methods according to the third aspect of the embodiments of the disclosure can be performed by the device location manager according to the first aspect of the embodiments of the disclosure. Further features or implementations of the method according to the third aspect of the embodiments of the disclosure can perform the functionality of the device location manager according to the first aspect of the embodiments of the disclosure and its different implementation forms.

In a first implementation of the method of the third aspect, the method further comprises a step of:
 receiving a location request from a slice specific function, and/or
 receiving a location information from a slice specific function, and/or
 sending a location report to a slice specific function.

A fourth aspect of the embodiments of the disclosure refers to a computer-readable storage medium storing program code, the program code comprising instructions for carrying out the method of the third aspect or one of the implementations of the first aspect.

BRIEF DESCRIPTION OF DRAWINGS

To illustrate the technical features of embodiments of the present disclosure more clearly, the accompanying drawings provided for describing the embodiments are introduced briefly in the following. The accompanying drawings in the following description are merely some embodiments of the present disclosure, modifications on these embodiments are possible without departing from the scope of the present embodiments of the disclosure as defined in the claims.

DESCRIPTION OF EMBODIMENTS

Figure 1:
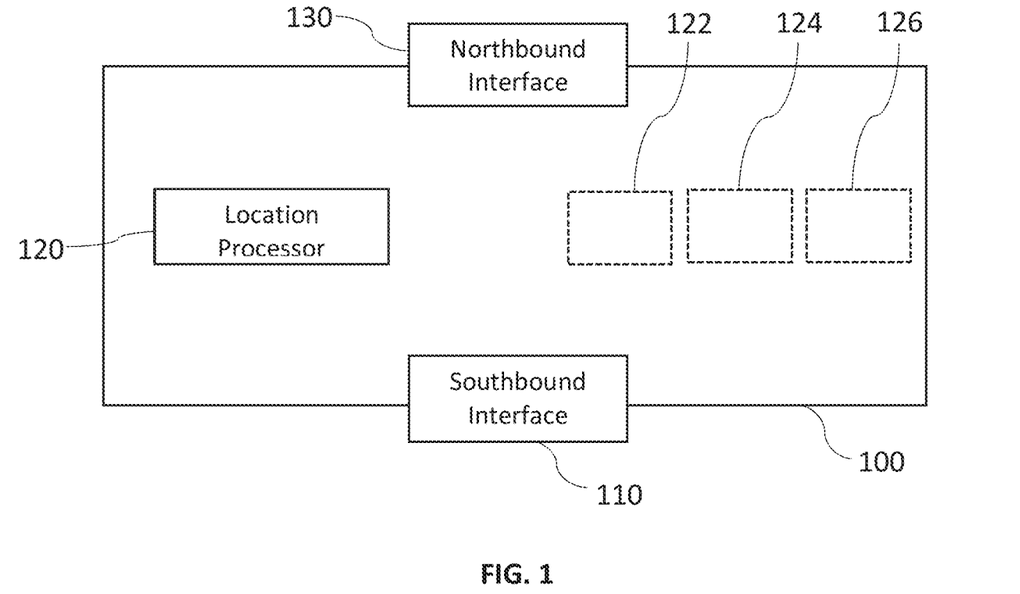
FIG. 1 is a block diagram illustrating a device location manager in accordance with an embodiment of the present disclosure.

FIG. 1 shows a device location manager 100 for a communication system. The device location manager 100 comprises a southbound interface 110, a location processor 120 and a northbound interface 130. Optionally (indicated in FIG. 1 with dashed lines), the device location manager 100 further comprises a location miner 122, a location collector 124, and/or a location data store 126. Location processor 120, location miner 122, location collector 124 and/or location data store 126 can be implemented on a same physical processor of the device location manager 100.

The device location manager 100 comprises a southbound interface 110 configured to receive a physical location information of a mobile device from an infrastructure manager of the communication system.

The device location manager 100 comprises a location processor 120 configured to map between the physical location information and a logical location information.

The device location manager 100 comprises a northbound interface 130 configured to send and/or receive the logical location information to and/or from at least two network slices of the communication system.

Figure 2:
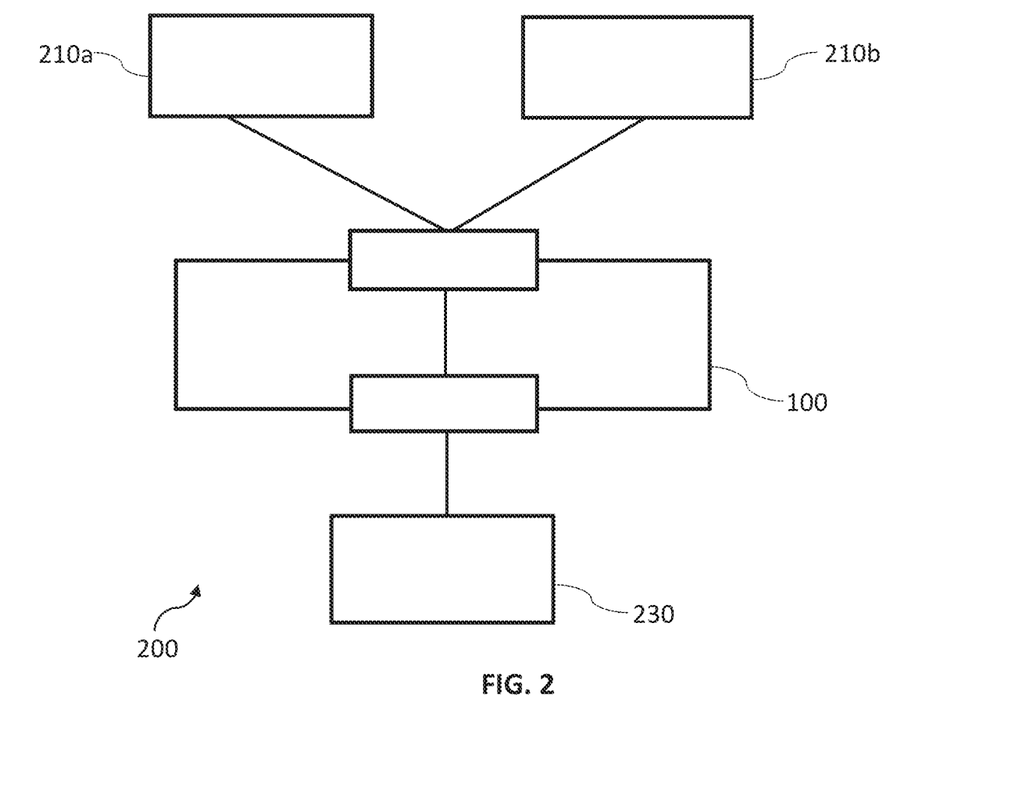
FIG. 2 is a block diagram illustrating a communications system in accordance with a further embodiment of the present disclosure.

FIG. 2 shows a communication system 200. The communications system 200 comprises at least two network slices 210a, 210b operating on a common infrastructure, and a device location manager 100, e.g. the device location manager 100 of FIG. 1, wherein the device location manager 100 is connected via a first interface to the at least two network slices 210a, 210b and via a second interface to an infrastructure manager 230. The infrastructure manager 230 can be e.g., any kind of unit that is configured to manage one or more physical devices of the infrastructure of the communication system 200.

The communication system 200 of FIG. 2 can be, for example, a 5G wireless communication system.

Experiments have shown that a complete, monolithic C-plane solution per slice is not efficient:

1. Different slices may share the same network function (e.g. location update, etc.).
2. Different slices may use the same information (e.g. device location information, etc.)
3. The C-plane operational effort is high, if common information needs to be exchanged from slice to slice.
4. The innovation pace of the slices (e.g., functionality upgrade) is slow. For instance, in case of the advance/update of a common functionality, all slices have such functionality/ related to this functionality should be updated as well.

Software-defined networking (SDN) and network-functions virtualization (NFV) are considered the foundation of a 5G network architecture. An SDN controller can have a built in mechanism (e.g., device tracking mechanism) to maintain the topology information and the inventory of end hosts and their location in the SDN network. For instance, a device can be tracked via the current attachment points. When the controller receives a PacketIn (PI) from the SDN switch or when the controller monitors topology changes, it update the attachment point of the device with our without a time stamp. Explicit NDP or ARP can be used to probe the device. A timer at the controller can monitor the inactive time of the device. When the timer expires, the controller can send a NDP (IPv6 case) or ARP (IPv4 case) message in a subnet of SDN switches (e.g., edge SWs). The device which receives the NDP or ARP message will respond. The controller can use the response message to update the device location.

Such controller platforms provide certain device tracking capabilities by themselves. However, that is not enough to offer a complete mobility management solution.

The system 200 of FIG. 2 has the advantage that location information can be shared between different network slices and an inefficient complete C-plane solution per slice is avoided.

Figure 3:
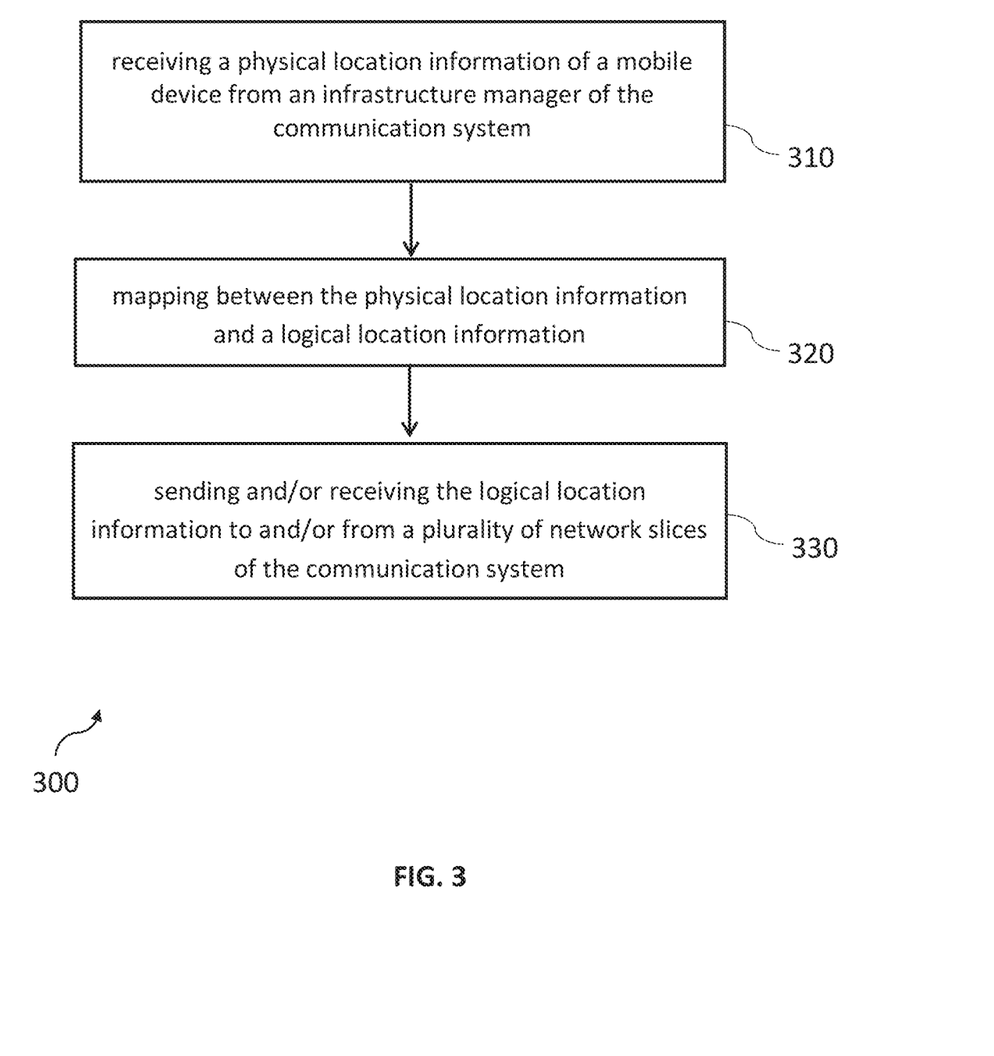
FIG. 3 is a flow chart of a method for for managing device location information in accordance with an embodiment of the present disclosure.

FIG. 3 shows a method 300 for managing device location information in a communication system 200. The method can be carried out, for example, on the device location manager 100 of FIG. 1.

The method 300 comprises receiving 310 a physical location information of a mobile device from an infrastructure manager of the communication system, e.g., the communication system 200 of FIG. 2.

The method 300 comprises mapping 320 between the physical location information and a logical location information.

The method comprises sending 330 and/or receiving the logical location information to and/or from at least two network slices of the communication system.

Figure 4:
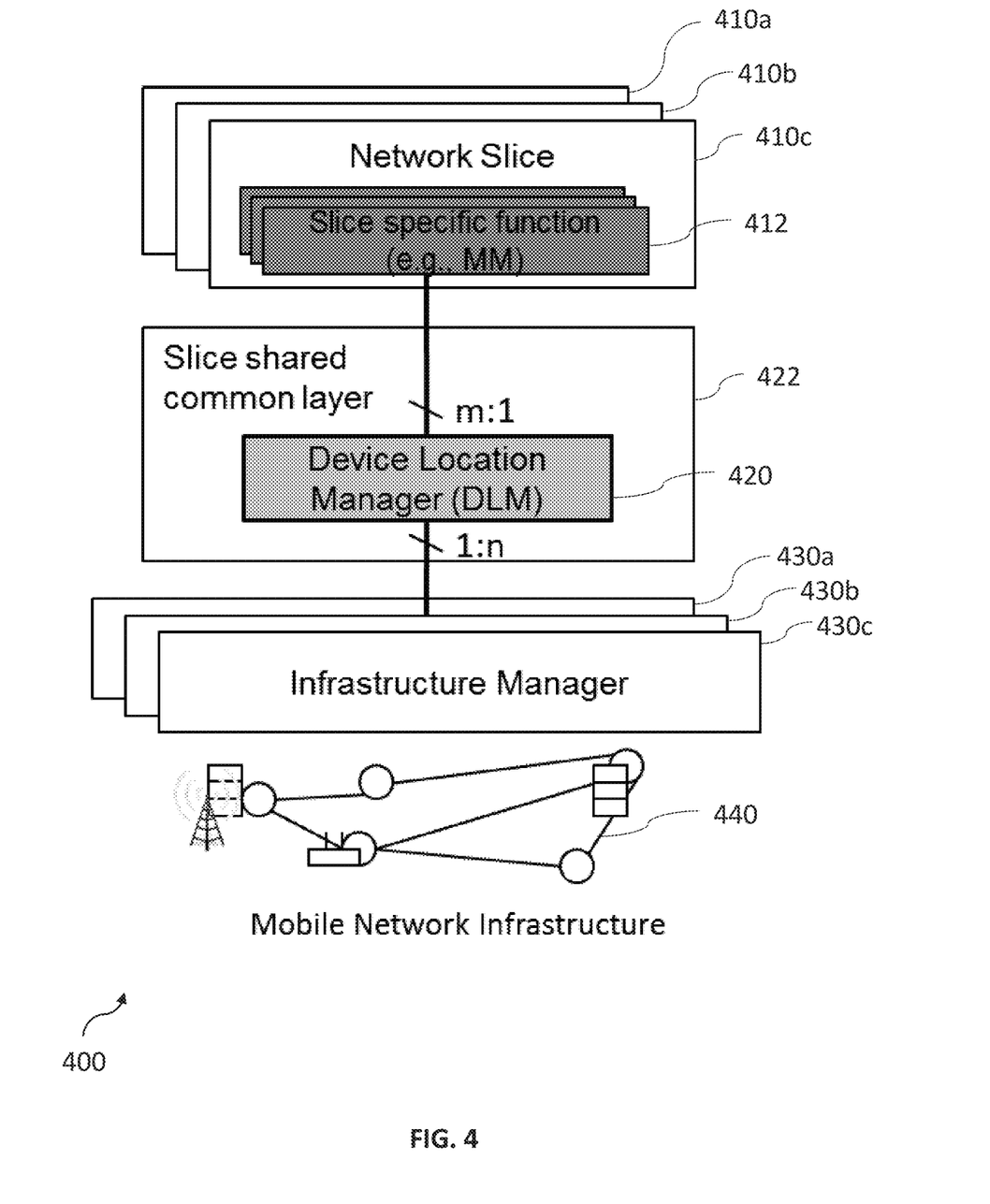
FIG. 4 shows a schematic illustration of a communication system in accordance with an embodiment of the present disclosure.

FIG. 4 is a schematic illustration of a communication system 400 comprising a device location manager 420 located in a slice shared common layer 422. The device location manager (DLM) 420 is configured to manage common device location information and to implement common related functionalities. The DLM 420 is part of a slice shared common layer where all the shared functionalities used by different network slices are located. It interfaces with infrastructure managers 430a, 430b, 430c (e.g., SDN controller, cloud management system . . . ) via its southbound interface and with slice specific functions 412 of network slices 410a, 410b, 410c via its northbound interface. The infrastructure managers 430a, 430b, 430c are configured to manage an infrastructure 440 of the communication system 400.

Figure 5:
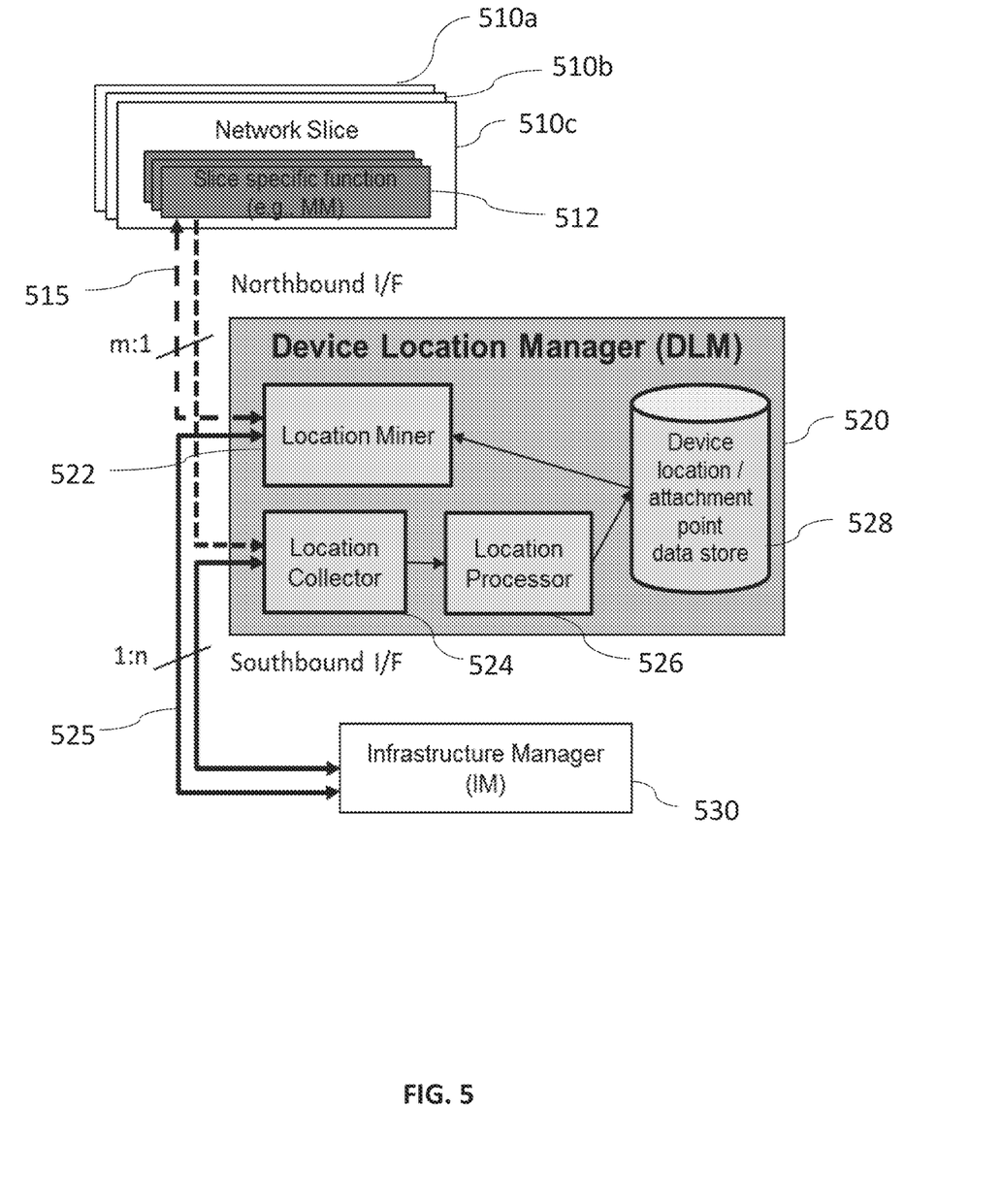
FIG. 5 shows a schematic illustration of the architecture and interfaces of a device location manager in accordance with an embodiment of the present disclosure.

FIG. 5 is a schematic illustration of the architecture and interfaces of a device location manager (DLM) 520. The DLM 520 comprises several functions (e.g., a location miner 520, a location collector 524 and a location processor 526) and one a location data store (Device location/attachment point data store 528).

The location data store 528 can be configured to store one or more of the following:

a device location information provided by functions (e.g., Mobility Management) in different network slices. Such information could be related to an access point, a cell, a tracking area, and/or further network information.

a device location information provided by infrastructure C-plane of different transport network slices. Such information can comprise an attachment point information, etc.

The Location Miner 522 can be configured to receive device location inquiries from slice specific network functions 512 through a northbound connection 515 to network slices 510a, 510b, 510c. It retrieves and processes location related information from the data store, and feeds it back to slice specific functions after processing (example of the information content after processing: device location relative to a network slice topology).

The Location Collector 524 can be configured to collect device location related information. It can define policies for device location information gathering from infrastructure (e.g., location accuracy, polling frequency . . . ) through its connection 525 with the infrastructure manager 530.

The Location Processor 526 can be configured to process the location related information based on certain policies and/or template (e.g. map the location information collected from different slices/access network to a unified format), and to update the device location data store (e.g. new device attachment point after an attach procedure in a given network slice).

The DLM 520 has two interfaces:
A northbound interface 515 between the network slice specific functions and the DLM 520.
A southbound interface 525 between DLM and infrastructure which is managed by the infrastructure manager 530.

Types of messages to be exchanged over the northbound interface 515 can include:
A location information from slice specific functions,
A location request from slice specific functions, and/or
A location report to slice specific functions.

These messages can include parameters such as slice ID, UE ID, and/or logical location. The location information and/or the location report can include a timestamp.

Types of messages to be exchanged over the southbound interface 525 can include:
Requests for infrastructure related location information, e.g. a monitoring request, which can comprise e.g., physical interfaces, devices to monitor/track, a location accuracy, a response time of inquiry, a tracking area, and/or
Reports from the infrastructure manager on the monitored location related data and statistics.

Figure 6:
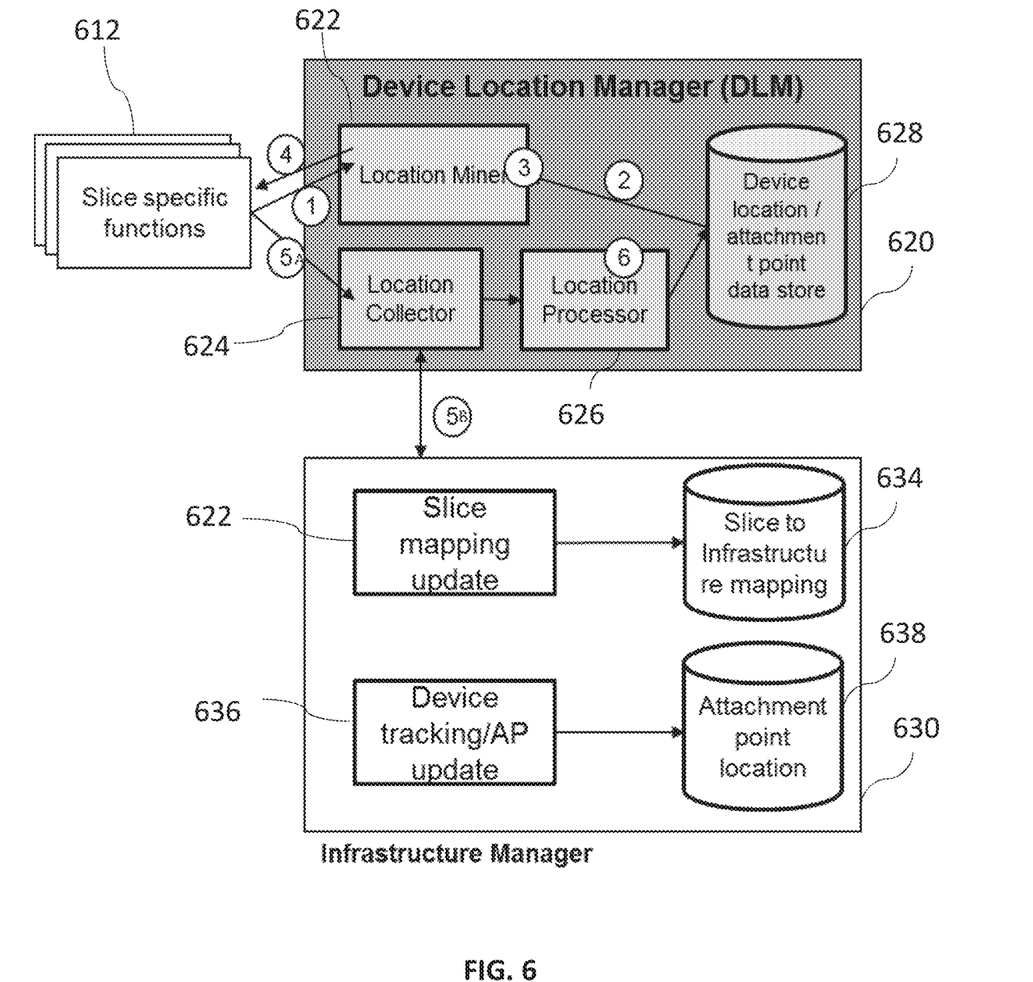
FIG. 6 shows a schematic diagram illustrating functions of a device location manager in accordance with an embodiment of the present disclosure.

FIG. 6 is a schematic diagram illustrating functions of a device location manager 620. The device location manager 620 interfaces (northbound) with slice-specific functions 612. Southbound it interfaces with an infrastructure manager 630.

Related procedures of functions in the DLM 620 of FIG. 6 include:

A procedure to inquire a UE location, wherein the procedure may involve the following steps (indicated with circled numbers in FIG. 6):

1. A slice specific function 612 sends a location request message to the DLM 620, which is received by a Location Miner 622.

2. The Location Miner 622 checks device location related information in the device location/attachment point data store 628.

3. The Location Miner 622 generates the location information upon the request from step 1, e.g. calculates APs (from that slice) closest to a current device location.

4. The Location Miner 622 sends a location response message back to the slice specific functions.

A procedure to initialize and/or update the device location data store 628:

5. The Location Collector 624 receives from the DLM the location related information and/or updates from two different sources:

5A. The Location Collector 624 receives location information and/or updates from slice specific functions 5B. The Location Collector 624 receives location information and/or updates from infrastructure, e.g. slice infrastructure mapping information and/or a device physical attachment point.

6. The Location Processor 626 processes the received inputs from the Location Collector 624 (e.g., according to a pre-defined policy, an extracted information, a data structure, etc.) and updates the device location data store 628.

The Infrastructure Manager 630 can be configured to perform device tracking and/or slice mapping update and to maintain slice to infrastructure mapping data base and Attachment point location data base in parallel to the procedures in the DLM 620.

Embodiments of the disclosure apply to both single and multi-operator scenarios. A single operator scenario refers to the case where all network slices the DLM connects to belong to the same operator. In this case the mobile network operator, MNO, owns the DLM. A multi-operator scenario refers to the case where a DLM connects to network slices from different MNOs.

Figure 7:
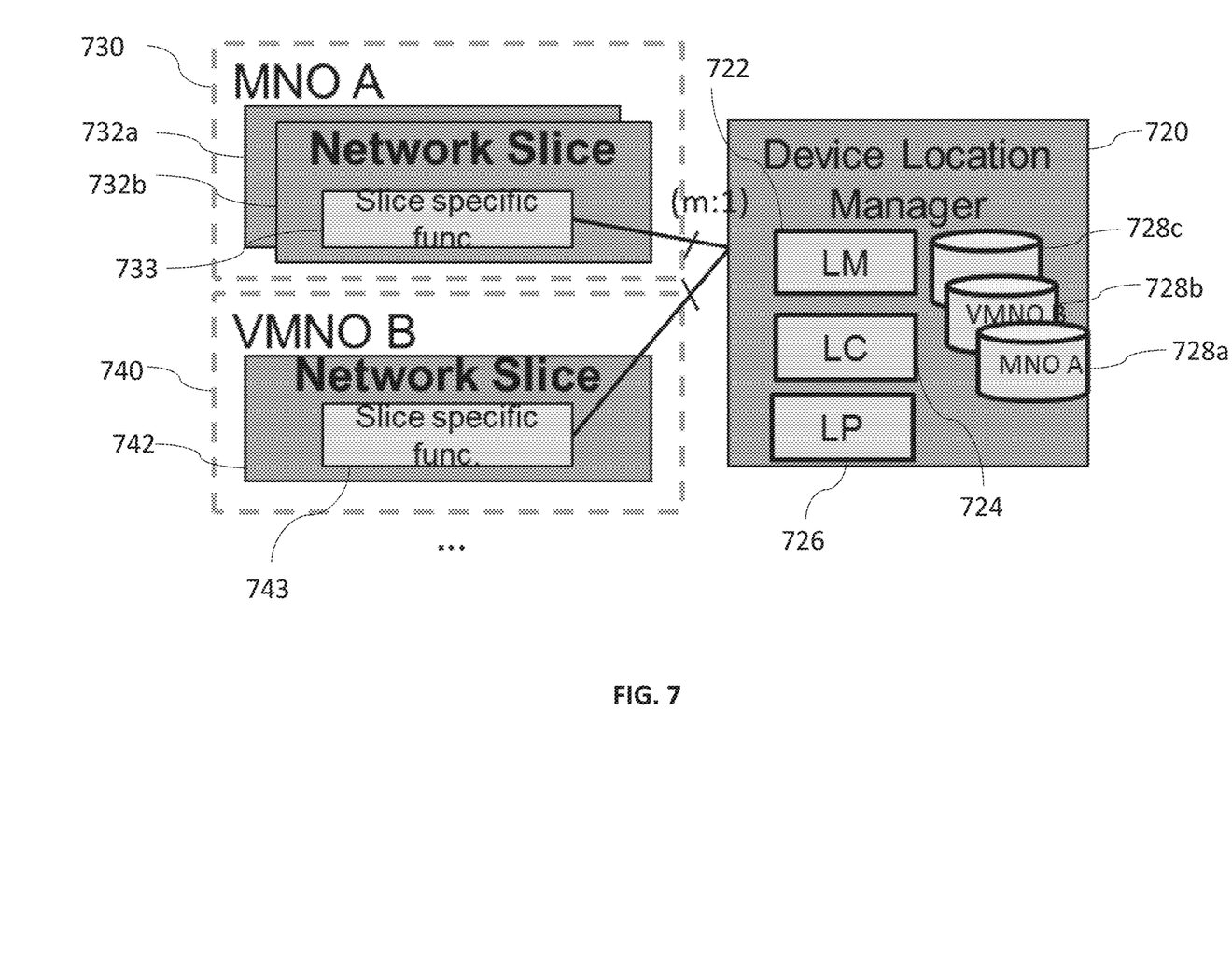
FIG. 7 shows a schematic diagram illustrating a device location manager in a multiple operator scenario in accordance with an embodiment of the present disclosure.

FIG. 7 is a schematic diagram illustrating a device location manager 720 in a multiple operator scenario. A first mobile network operator (MNO) A covers a first scope 730, which covers a first and a second network slice 732a, 732b of the first network operator. The first and second network slice 732a, 732b of the first network operator comprise slice-specific functions 733.

A second network operator covers a second scope 740, which covers a network slice 742 with further slice-specific functions 743.

In this case, Location Manager (LM) 722, Location Collector (LC) 724 and Location Processor (LP) 726 functions in the DLM can still be shared by network slices from different mobile network operators (MNO). Only the device location data stores 728a, 728b, 728c are separated and maintained individually by each MNO. For instance, MNO A owns the infrastructure and shares the infrastructure to some Virtual Mobile Network Operators (e.g., VMNO B) or verticals. MNO A owns the DLM functions and the physical resource of a first data storage 728a. The MNO A and VMNO B maintain the contents of their own share of their data storages 728b, 728c.

The DLM 720 is a basic module which provides device location information. Therefore, it can be used by many other control functions (slice common or slice specific) of the network, e.g., network slice selection function to choose the appropriate network slice for the UE device according to its location, flow management function to adjust the UE flow path according to UE mobility, network management function to optimize network resources by asking UEs to handover to nearby base stations, etc.

Multiple use cases exist for the DIM 720.

The network slicing primarily targets a partition of the core network, but it is not excluded that RAN may need specific functionality to support multiple slices or even partitioning of resources for different network slices.

Particular uses can include:

Use case 1: multiple network slices use the same physical interface of a device, where a) the device is attached to one slice at one time or b) the device is attached to multiple slices in parallel.

Use case 2: a device uses different physical interface (e.g., cellular interface+WIFI interface) to connect to different network slice. Also two sub cases here as use case 1: a) the device is attached to one slice at one time or b) the device is attached to multiple slices in parallel.

Figure 8A:
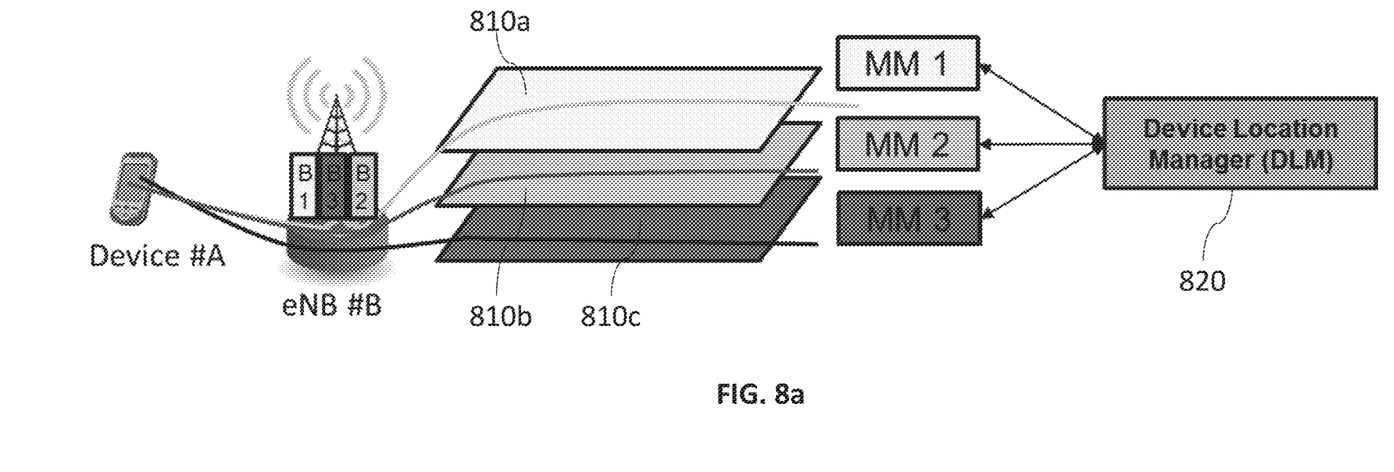
FIG. 8a shows a schematic diagram illustrating a procedure of location support for paging in a use case in accordance with an embodiment of the present disclosure.

FIG. 8a illustrates an example of the procedure of location support for paging in above-mentioned use case 1b). In the initial state, a device # A is active on a second slice 810b (CONNECTED) but idle on a first slice 810a (IDLE). Downlink traffic to device # A in the first slice 810a arrives and MM 1 initiates a paging procedure. MM1 consults a device location manager (DLM) 820 for a location of device # A. The DLM 820 checks its UE location data store. As device # A is known to be active on the second slice 810b, it is connected to eNB # B. The DLM 820 derives the virtual eNB to which MM 1 should send the paging message to initiate connection to device # A, in this case B1. Once device # A is connected to the first slice 810a, MM 1 informs the DLM 820 to update the UE location data store.

Figure 8B:
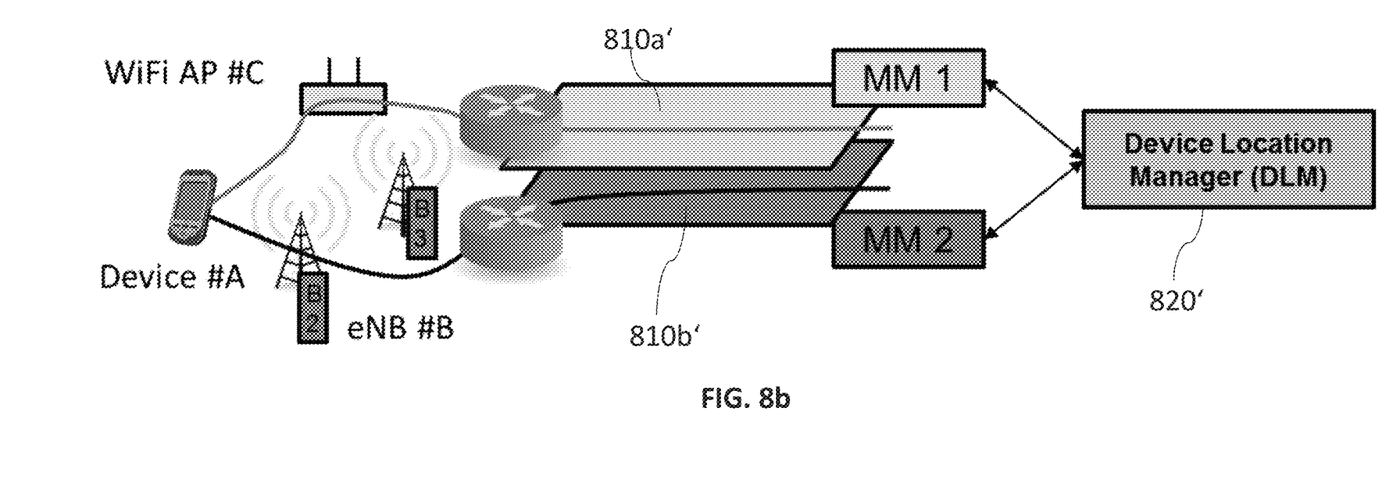
FIG. 8b shows a schematic diagram illustrating a procedure of location support for paging in another use case in accordance with an embodiment of the present disclosure.

FIG. 8b illustrates an example of the procedure of location support for paging in above-mentioned use case 2b). In the initial state, a device # A is active on a first slice 810a' (Connected to WiFi AP # C) but idle on a second slice 810b' (IDLE). Downlink traffic to device # A in the second slice 810b' arrives and MM 2 initiates a paging procedure. MM1 consults DLM for device # A location. DLM check its UE location data store. As device # A is known to be active on the first slice 810a', it is connected to WiFi AP # C. DLM 820 uses the location information of device # A to estimate e closest virtual eNBs for the second slice 810b'. It reports to MM 2 the set of eNBs to which it should send the paging message to initiate connection to device # A, in this case eNBs B2 and B3. Once device # A is connected to the second slice, MM 2 informs the DLM 820' to update the UE location data store.

Figure 9:
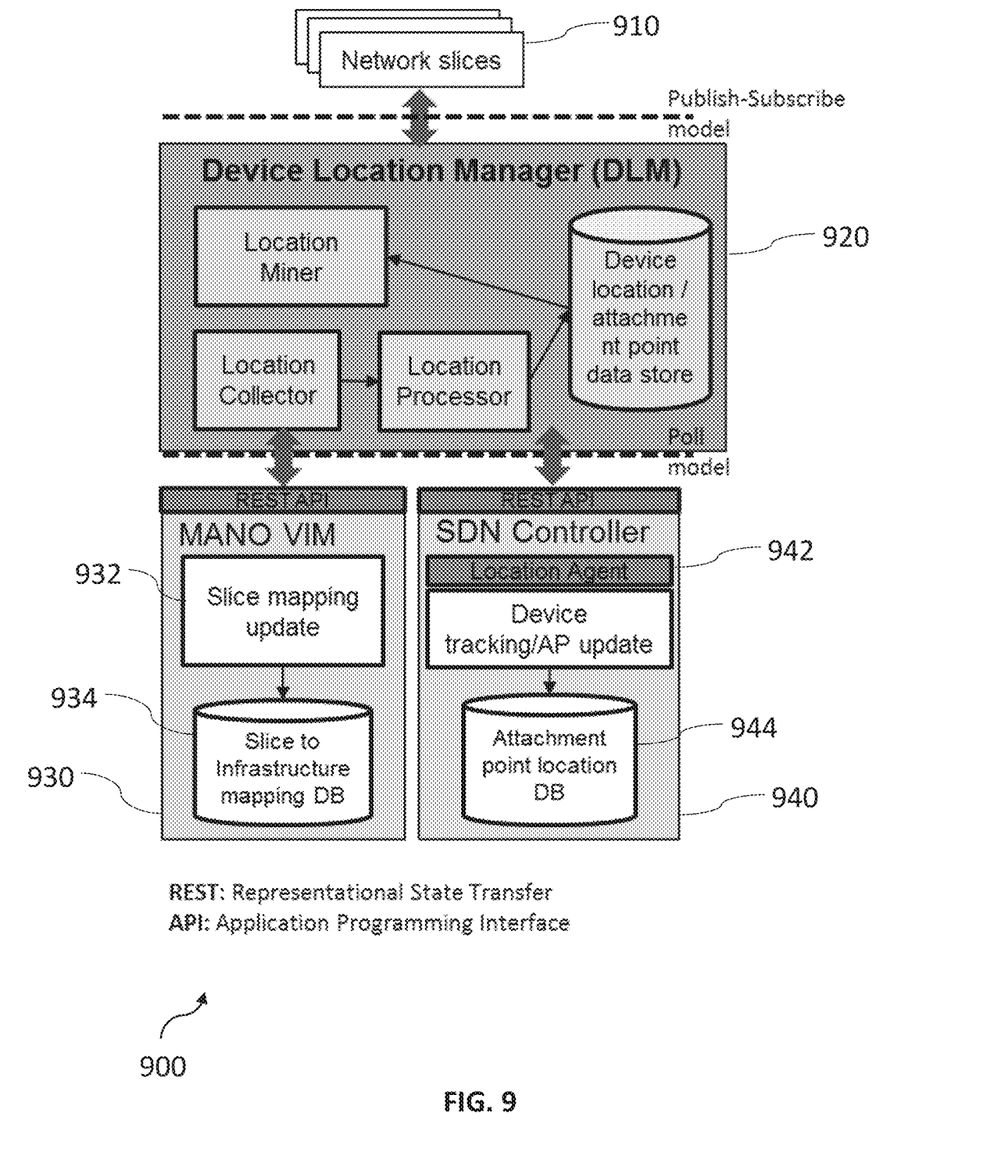
FIG. 9 shows a schematic diagram illustrating how a device location manager can be implemented in accordance with an embodiment of the present disclosure.

FIG. 9 shows an example of how a DLM 920 can be implemented and integrated in a communication system 900.

A slice mapping update is implemented by a MANO Virtualized Infrastructure Manager (VIM) 930 (e.g., OpenStack Heat). An AP/device location update is implemented by a SDN Controller 940 (e.g., a Host Subsystem in an ONOS controller).

The device location manager (DLM) 920 is implemented as a shared virtual network function (VNF) and deployed in the same infrastructure as control plane functions of network slices 910.

Northbound Interface (Network Slice—DLM): The DLM 920 exposes an API to network slices 910. Network slice functions subscribe to the location information of a given device. When the location info of such device changes, the DLM 920 will publish an update to all network slice functions subscribed to changes on that device.

Southbound Interface (interfacing between the DLM and infrastructure): The DLM 920 consumes the exposed HTTP REST API of the VIM and the SDN controller. The DLM 910 polls the VIM for information on the mapping of virtual access points to physical access points of the network slices that it is serving. The DLM 920 polls the SDN controller 940 for information on the current location of the devices that the network slices 910 are tracking.

An optional Location Agent converts the device location tracking request from the DLM 920 to configuration parameters/settings of the device tracking/AP function in the SDN controller 940 (e.g., track device location with a given frequency).

The embodiment shown in FIG. 9 uses the publish-subscribe model in the northbound interface and the poll model in the Southbound interface. Other embodiments of the disclosure may be configured differently, e.g. with both interfaces using a poll model or with both interfaces using a publish-subscribe model.

As outlined above, embodiments of the disclosure improve the operational efficiency in a network slice based 5G system. This can be achieved by:

1. Reducing the management signalling (e.g., UE status exchange between slices) and control signalling (e.g., location update).

2. Facilitating mobility management cross network slices by providing location management in a common layer to all slices.

In embodiments of the disclosure, the user experience can be improved since more accurate location information can be provided to different network slices. Meanwhile, due to the common device location management function and decoupled logical and physical infrastructure design, the system evolution and the introduction of new services can become easier and faster.

Embodiments of the disclosure can relate to:

A system providing device location related support for control plane functions in network slices comprising:
   Device location manager module and related functions,
   Interfaces of this module to infrastructure manager, and/or
   Interfaces of this module to functions in different network slices A method to deal with device location information cross different network slices A method to deal with device location information across multiple domains (i.e., multiple mobile network operator and/or multiple infrastructure providers)

The foregoing descriptions are only implementation manners of the present embodiments of the disclosure, the scope of the present embodiments of the disclosure is not limited to this. Any variations or replacements can be easily made through person skilled in the art. Therefore, the protection scope of the present embodiments of the disclosure should be subject to the protection scope of the attached claims.

What is claimed is:

1. A device location manager for a communication system, the device location manager comprising:
   a first interface configured to receive physical location information of a mobile device from an infrastructure manager of the communication system;
   a location processor configured to map between the physical location information of the mobile device and a logical location information of the mobile device;
   a second interface configured to send and/or receive the logical location information of the mobile device to and/or from at least two network slices of the communication system;
   a location collector configured to:
      obtain a physical-logical mapping from at least one network slice of the at least two network slices or the infrastructure manager;
      obtain a mapped location information based on the physical-logical mapping; and define policies for mobile device location information obtained from the infrastructure manager, through a connection between the infrastructure manager and the location collector; and one or more location data non-transitory memory devices configured to store:
provided logical location information of mobile devices provided by functions and/or infrastructure C-plane of the at least two network slices; or
provided physical location information of mobile devices provided by functions and/or infrastructure C-plane of the at least two network slices; and wherein the location processor is further configured to:
receive the mapped location information from the location collector; and
update the one or more location data non-transitory memory devices according to the mapped location information.

2. The device location manager of claim 1, wherein:
the logical location information of the mobile device comprises an identifier of a logical user equipment or at least one of a logical access node or a tracking area; or
the physical location information of the mobile device comprises an identifier of a physical access node.

3. The device location manager of claim 1, wherein the one or more location data non-transitory memory devices comprise at least two slice-specific location data non-transitory memory devices.

4. The device location manager of claim 1, further comprising:
a location miner configured to determine a device logical location in a network slice of the at least two network slices.

5. The device location manager of claim 1, wherein the second interface is configured to:
receive a location request from a first slice specific function of the functions of the at least two network slices; and
perform at least one of:
receive a first location information from a second slice specific function of the functions of the at least two network slices, or
send a location report to a third slice specific function of the functions of the at least two network slices.

6. The device location manager of claim 1, wherein the first interface is further configured to send a monitoring request to the infrastructure manager, wherein the monitoring request comprises one or more of the following:
an information about a physical interface;
an information about a device to track;
a location accuracy;
a response time of the monitoring request; and
duration of tracking.

7. The device location manager of claim 1, wherein:
the first interface is configured to use a poll model; or
the second interface is configured to use a publish-subscribe model.

8. A communication system, comprising:
at least two network slices operating on a common infrastructure; and
a device location manager, comprising:
a first interface configured to receive physical location information of a mobile device from an infrastructure manager of the communication system;
a location processor configured to map between the physical location information of the mobile device and a logical location information of the mobile device;
a second interface configured to send and/or receive the logical location information of the mobile device to and/or from the at least two network slices;
a location collector configured to:
obtain a physical-logical mapping from at least one of network slice of the at least two network slices or the infrastructure manager;
obtain a mapped location information based on the physical-logical mapping; and
define policies for mobile device location information obtained from the infrastructure manager, through a connection between the infrastructure manager and the location collector; and
one or more location data non-transitory memory devices configured to store:
provided logical location information of mobile devices provided by functions and/or infrastructure C-plane of the at least two network slices; or
provided physical location information of mobile devices provided by functions and/or infrastructure C-plane of the at least two network slices; and
wherein the location processor is further configured to:
receive the mapped location information from the location collector; and
update the one or more location data non-transitory memory devices according to the mapped location information.

9. The communication system of claim 8, further comprising:
a mobile device coupled to multiple network slices of the at least two network slices via a common physical interface.

10. The communication system of claim 8, further comprising:
a mobile device coupled to multiple network slices of the at least two network slices via two or more physical interfaces.

11. A method for managing device location information in a communication system, the method comprising:
receiving physical location information of a mobile device from an infrastructure manager of the communication system;
mapping between the physical location information of the mobile device and a logical location information of the mobile device;
sending and/or receiving the logical location information of the mobile device to and/or from at least two network slices of the communication system;
obtaining a physical-logical mapping from at least one network slice of the at least two network slices or the infrastructure manager;
obtaining a mapped location information based on the physical-logical mapping;
defining policies for mobile device location information obtained from the infrastructure manager, through a connection between the infrastructure manager and a location collector;
storing the following location information:
provided logical location information of mobile devices provided by functions and/or infrastructure C-plane of the at least two network slices; or provided physical location information of mobile devices provided by functions and/or infrastructure C-plane of the at least two network slices; and updating, according to the mapped location information, the stored provided logical location information of mobile devices, or the stored provided physical location information of mobile devices.

12. The method of claim 11, further comprising:

receiving a location request from a first slice specific function of the functions of the at least two network slices; or performing at least one of:
- receiving a first location information from a second slice specific function of the functions of the at least two network slices, or
- sending a location report to a third slice specific function of the functions of the at least two network slices.

\* \* \* \* \*